United States Patent [19]

Pomfret

[11] 4,323,253
[45] Apr. 6, 1982

[54] NOISE-INSULATING ENCLOSURE SEAL

[75] Inventor: Colin T. Pomfret, Graz, Austria

[73] Assignee: Hans List, Graz, Austria

[21] Appl. No.: 169,516

[22] Filed: Jul. 21, 1980

[30] Foreign Application Priority Data

Aug. 6, 1979 [AT] Austria .................................. 5383/79

[51] Int. Cl.³ .......................... F16J 15/06; B65D 53/06
[52] U.S. Cl. ........................................ 277/12; 277/97;
277/178; 220/378
[58] Field of Search .................. 277/12, 4, 97–99,
277/178, 181–186, 225, 81 R, 92, 95; 220/378

[56] References Cited

U.S. PATENT DOCUMENTS

| 2,288,263 | 6/1942 | Bostwick | 220/378 X |
| 2,639,928 | 5/1953 | Robbins | 277/99 |
| 2,744,217 | 5/1956 | Aikman | 220/378 X |
| 3,018,127 | 1/1962 | Dibrosielski et al. | 220/378 X |
| 4,002,263 | 1/1977 | Marcellini | 220/378 |

Primary Examiner—Robert S. Ward, Jr.
Attorney, Agent, or Firm—Watson, Cole, Grindle & Watson

[57] ABSTRACT

A sealing element for a dividing gap (4) between two parts (2,3) which at least partly encloses a sealed space (1), comprises an elastic gasket element (5) fitted in the gap, and a connecting device (6) for connecting the two parts together. To achieve a reliable seal even where there are long gaps as well as to prevent the transmission of noise generating vibrations from one of the two parts to the other part through the gap an elastic initial tension element (11) is provided between the connecting device (6) and at least one of the two parts (2,3) which at least partly enclose the sealed space (1), and the connecting device (6) as well as the initial tension element is arranged within the interior of the sealed space (1).

10 Claims, 13 Drawing Figures

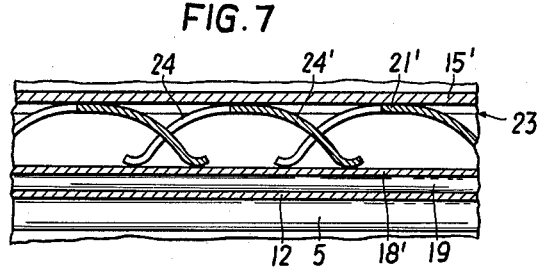
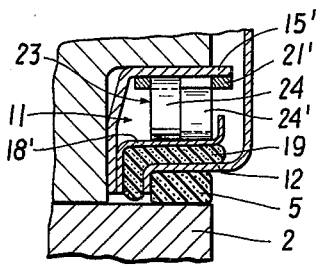
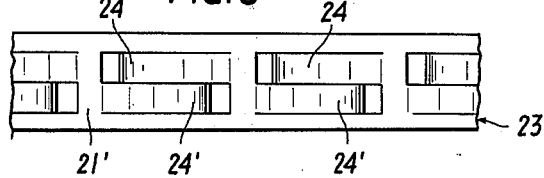
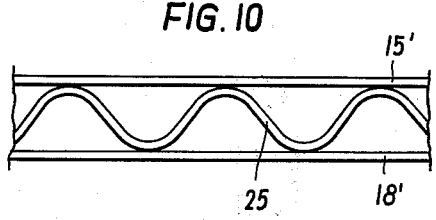
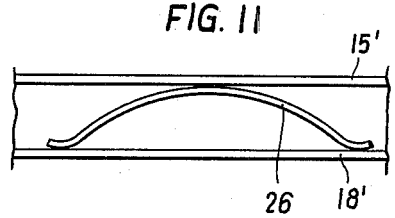
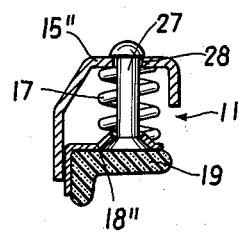
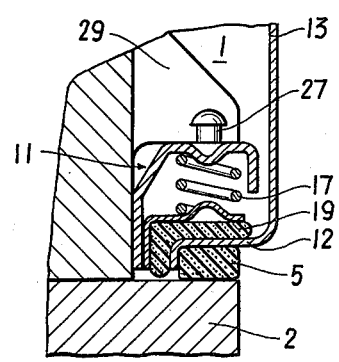

NOISE-INSULATING ENCLOSURE SEAL

BACKGROUND OF THE INVENTION

This invention relates to a sealing element for a dividing gap between two parts which at least partly enclose a sealed space, comprising an elastic gasket element fitted in the gap, and a connecting device for connecting the two parts together.

DESCRIPTION OF THE PRIOR ART

Elements of the kind mentioned above are known and normally comprise solid gasket elements of approximately rectangular cross sectional configuration which may consist of a wide variety of materials depending on prevailing operational conditions and requirements, for example external conditions such as pressure, temperature or type of medium present inside and outside the sealed space. The connecting device has two distant functions, namely, firstly, to connect firmly together the two parts which at least partly enclose the sealed space and secondly to produce the necessary pressure which must be applied to the sealing element in order to obtain a secure and reliable sealing effect.

Elements of this kind are, however, liable to present problems, for example where one of the two parts which enclose the sealed space is subjected to noise generating vibrations and these vibrations are not to be transmitted to the other part. The connecting device which is normally provided with conventional sealing elements of the kind specified, such as, for example, protruding lugs on both parts which are fastened together by means of bolts, transmit virtually undiminished noise generating vibrations from one part to the other part through the gap with the result that the latter part also contributes to overall noise emission.

Further problems arise in connection with the desired application of uniform pressure to the sealing element which is essential for reliable sealing action, and especially where extensive sealing lengths are involved, the sealing element may be subjected to uneven stress application which will inevitably result in a faulty seal.

SUMMARY OF THE INVENTION

It is an object of the present invention to provide a sealing element for the gap between two parts which at least partly enclose a sealed space in such a way as to achieve a reliable seal even where there are long gaps as well as to prevent the transmission of noise generating vibrations from one of the two parts to the other part through the gap.

According to the present invention this is achieved by the provision of an elastic initial tension element between the connecting device and at least one of the two parts which at least partly enclose the sealed space and by arranging the connecting device as well as the initial tension element within the sealed space.

Since the sealing element has a certain amount of elasticity and the connecting device acts effectively on at least one of he two parts only through the elastic initial tension element this arrangement achieves effective isolation of the two parts in respect of noise producing vibrations in an extremely simple manner. Moreover, due to the provision of the elastic initial tension element the application force of the connecting device is essentially evenly distributed along the entire length of the gasket element thus ensuring a safe seal even with extensive lengths.

According to a further embodiment of this invention a noise-insulating element may be provided between that one of the sealed space enclosing parts which co-acts with the elastic initial tension element and the latter element itself. The additional provision of such further element achieves a further improvement in vibrational isolation of the two parts.

According to another embodiment of this invention the initial tension element comprises at least one track-shaped seating member on which spring elements are arranged; these spring elements provide the elasticity for the initial tension element and thus ensure, on the one hand vibrational isolation of the two parts and, on the other hand even distribution of the pressure applied by the connecting device to the gasket element over the full length thereof.

In a further development of the present invention the spring elements of the elastic initial tension element may take the form of tongues punched and angled out of a flat spring. This is a very simple way of providing the spring elements, easy to make and equally easy to apply to the initial tension element.

According to a further development of this invention the spring element may consist of a corrugated flat spring which is also easy to make and manipulate.

According to another embodiment of this invention the spring element consists of spaced helical springs. By choosing helical springs with relatively different elastic constants and/or varying the number of springs such an arrangement affords an easy method of varying the pressure applied to the gasket element along the gap and adapting it to given requirements.

In a further development of the present invention such helical springs may be combined with the track-shaped seating members to form an assembly unit, for example, preassembled and secured by means of rivets. Naturally due care must then be taken to ensure that the rivets, whilst providing an upper end stop for the unstressed springs, will not impede the elastic compression of the initial tension element. This kind of preassembled unit greatly facilitates the fitting and application of the element as a whole.

According to a still further embodiment of this invention as applied to initial tension elements of the kind comprising a pair of track-shaped seating members, the noiseinsulating element may be permanently connected, for example, adhesively or by vulcanizing, to that side of one of the seating members which is opposite the helical springs. In this way the noise insulating element would be included in a preassembled unit of the initial tension element resulting in a further overall simplification of assmebly and stripping operations for the element as a whole.

DESCRIPTION OF THE DRAWINGS

The present invention is hereinafter more particularly described with reference to embodiments thereof illustrated by way of example in the accompanying drawings wherein:

FIG. 7 is a side view of an initial tension element with a modified spring element accoding to this invention, FIG. 8 is a plan view of the spring element according to FIG. 7, FIG. 9 is a sectional view as in FIG. 6 showing a spring element according to FIGS. 7 and 8, FIGS. 10 and 11 are side views of further kinds of spring elements according to this invention, FIG. 12 is a sectional view through an initial tension element incorporated in an assembly unit and FIG. 13 is a sectional view through the initial tension element according to FIG. 12 when fitted.

DESCRIPTION OF THE PREFERRED EMBODIMENTS

Figure 1:
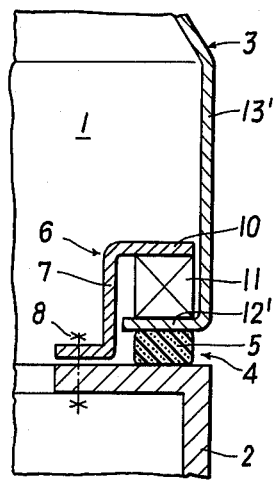
FIG. 1 is a schematic representation of part of a sealed space or enclosure sealed with the aid of an element according to this invention.

As shown in FIG. 1, the sealed space 1 is bounded by two parts 2 and 3, with a dividing gap 4 therebetween. In this gap 4 a solid gasket-type sealing element 5 is fitted and compressed by the two parts 2,3 with the aid of a connecting device 6. The connecting device 6 consists of a clamping bracket 7 and a screw 8 whereby the bracket 7 is secured to the part 2. When the screw 8 is tightened the arm 10 of the bracket 7 presses against an elastic initial tension element 11, which latter is only schematically indicated in the drawing and transmits the clamping force applied thereto by the screw 8 elastically to a flanged edge 12' of a wall 13' of part 3.

Owing to this inventive arrangement of the sealing element for the dividing gap 4 between the two parts 2,3 which at least partly enclose the sealed space 1, two substantial advantages are realised. On the one hand, subject to correct assembly of the connecting device 6, the force essential to the sealing function of the gasket element 5 is not dependent on the force applied by the screw 8 but only on the predetermined force which depends on the characteristics of the elastic initial tension element 11, and, secondly, effective isolation of the two parts 2 and 3 from noise generating vibrations is achieved by the elastic application of the sealing force through the initial tension element 11. The first of the abovementioned advantages is vital in application to elements of considerable length because the larger number of screws or connecting elements there required may very easily entail an uneven application of force to the gasket element 5 by the connecting device 6. Due to the provision of the elastic initial tension element 11, however, a satisfactory distribution of the sealing force over the whole length of the gasket element 5 is also guaranteed in such an arrangement. The second advantage is particularly important where one of the parts, for example, part 2, is subjected to noise generating vibrations and the transmission of these vibrations from the part 2, which is insulated against noise emission in a separate manner (not shown), through the gap 4 to part 3 is to be avoided. The connecting device 6 which is connected by the screw 8 to the part 2, transmits noise generating vibrations from the part 2 to the topside of the elastic initial tension element 11 which element absorbs these noise vibrations by virtue of its elastic properties and thus prevents further transmission to part 3. Naturally the gasket element 5 also has the required properties to ensure that noise vibrations are transmitted further only to a very insignificant degree.

Figure 2:
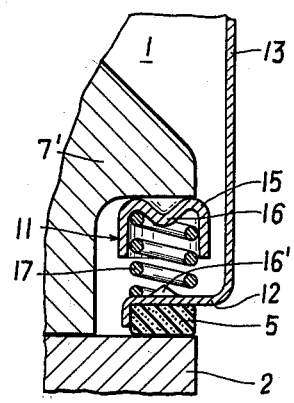
FIG. 2 is a section through an element, as fitted, for sealing the dividing gap between two parts which enclose a sealed space between them, in accordance with this invention.

The initial tension element 11 shown in FIG. 2 comprises an upper, track-shaped seating member 15 held down by a bracket 7' by means of clamping means (not specifically shown). Within the track, opposite the bracket 7', the seating member 15 comprises spaced domed portions 16 which act as seating points for helical springs 17, representing the spring elements. The helical springs 17 are mounted on an inwardly angled edge 12 of the wall 13 at the end thereof which is opposite the seating member 15; the inturned edge 12 also comprises domed portions 16' which serve as seating points. The edge 12 is pressed by the helical spring 17 against the gasket element 5 resting on the part 2 thereby ensuring a perfect seal around the sealed space 1.

Figure 3:
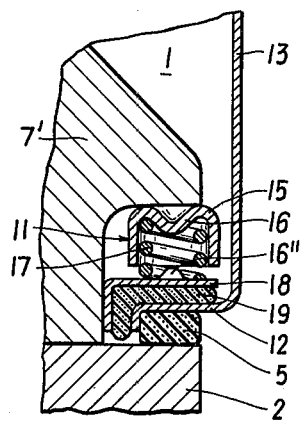
FIG. 3 is a sectional view as in FIG. 2 showing another embodiment of the invention.

The element shown in FIG. 3 is largely similar to that shown in FIG. 2 with the difference that in this arrangement the initial tension element 11, in addition to the upper seating member 15 and the helical springs 17, comprises a lower seating member 18 and a noise-isulating element 19. The lower seating member 18 comprises domed seating portions 16" for the helical springs 17 whilst the underside thereof, opposite the springs 17, presses against the additionally provided noise-insulating element 19. The resulting improved distribution of compression further enhances the sealing function of the element as a whole.

Figure 4:
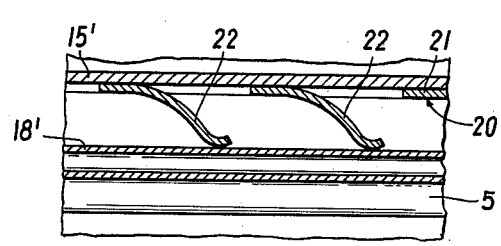
FIG. 4 is a side view of the spring element for an initial tension element according to this invention.
Figure 5:
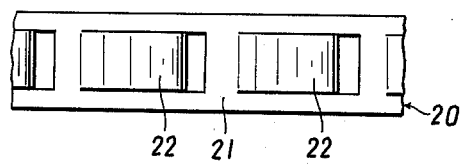
FIG. 5 is a plan view of the spring element shown in FIG. 4.
Figure 6:
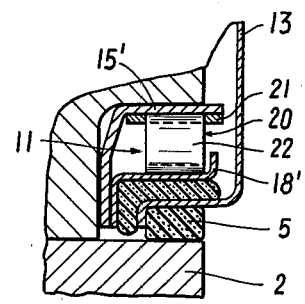
FIG. 6 is a sectional view through the details surrounding the gap including a spring element of the kind shown in FIG. 4 and 5.

The spring element 20 shown in FIGS. 4 and 5, is visible in FIG. 6 together with the complete initial tension unit 11 in situ. In this embodiment of the invention the spring element 20 consists of tongues which are punched and angled out of a flat spring 21 and it is arranged between an upper track-shaped seating member 15' and a lower seating member 18'. The remaining details shown in FIG. 6 have already been fully described with reference to FIGS. 2 and 3.

FIGS. 7 and 8 show a spring element 23 according to another embodiment of the invention; FIG. 9 showing this element in situ together with the complete initial tension element 11. In this arrangement the tongues 24,24' are arranged side by side in pairs but angled in relatively opposite directions away from the flat spring 21', which also improves lateral force distribution. The remaining details shown in FIG. 9 correspond to those already described with reference to FIGS. 2 and 3.

According to FIG. 10 the spring element is a corrugated flat spring 25 simply placed between upper 15' and lower 18' seating elements. This modification makes manufacture and assembly particularly easy.

According to FIG. 11 the spring element consists of segments 26 which are bent upwardly at the ends and, like the corrugated flat spring 25 in FIG. 10 are simply placed between the upper 15' and lower 18' seating members of the initial tension element.

FIG. 12 shows an initial tension element 11 wherein an upper seating element 15", a lower seating element 18" and spaced helical springs 17 therebetween are connected together by rivets 27 located in the lower seating member 18"; each spring leaving an annular gap around the rivet concentric with a clearance hole 28 in the upper seating member 15" for movability in the axial direction, the whole making up a single assembly unit. The noise-insulating element 19 is also part of the assembly unit, being secured, for example by adhesive, to that side of the lower seating member 18" which is opposite the helical springs 17.

FIG. 13 illustrates the initial tension element 11 accoding to FIG. 12 in situ wherein the helical springs 17 are compressed, through a lug 29, by clamping means (not shown) so that the heads of the rivets 27 project above the top of the initial tension element 11. Naturally, this requires the provision of suitable recesses in the lugs 29. All other details shown in FIG. 13 have already been described with reference to FIGS. 2 and 3.

I claim:

1. A sealing element for a dividing gap between two parts which at least partly enclose a sealed space, comprising an elastic gasket element fitted in said gap, and a connecting device for connecting said two parts together, wherein an elastic initial tension element is provided between said connecting device and at least one of said two parts which at least partly enclose said sealed space, and said connecting device as well as said initial tension element is arranged within the interior of said sealed space.

2. An element according to claim 1, wherein a noiseinsulating element is provided between that one of said parts which co-acts with said elastic initial tension element and the initial tension element itself.

3. An element according to claim 1, wherein said initial tension element comprises at least one track-shaped seating member on which spring elements are arranged.

4. An element according to claim 3, wherein said spring elements consist of tongues punched and angled out of a flat spring.

5. An element according to claim 3, wherein said spring element is a corrugated flat spring.

6. An element according to claim 3, wherein said spring element consists of spaced helical springs.

7. An element according to claim 6, wherein said helical springs together with the track-shaped seating members form an assembly unit.

8. An element according to claim 7, wherein said connecting unit is secured by rivets.

9. An element according to claim 2 or 7, having two track-shaped seating members and wherein said noise-insulating element is permanently secured to that side of one of said track-shaped seating members which is opposite said helical springs.

10. An element according to claim 9, wherein said noise-insulating element is secured by means of an adhesive.

* * * * *